Oct. 25, 1960  S. J. REIF  2,957,511
LAMINATED CORE FORMING MACHINE
Filed Feb. 3, 1956  6 Sheets-Sheet 1
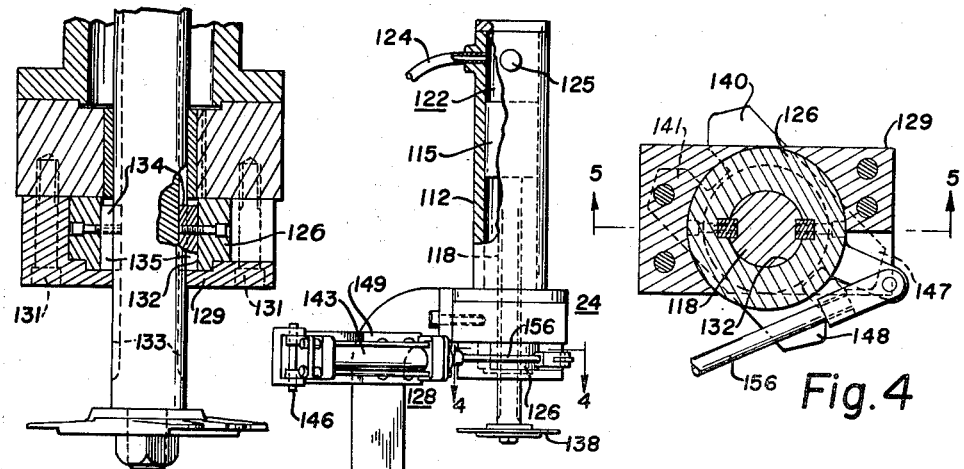
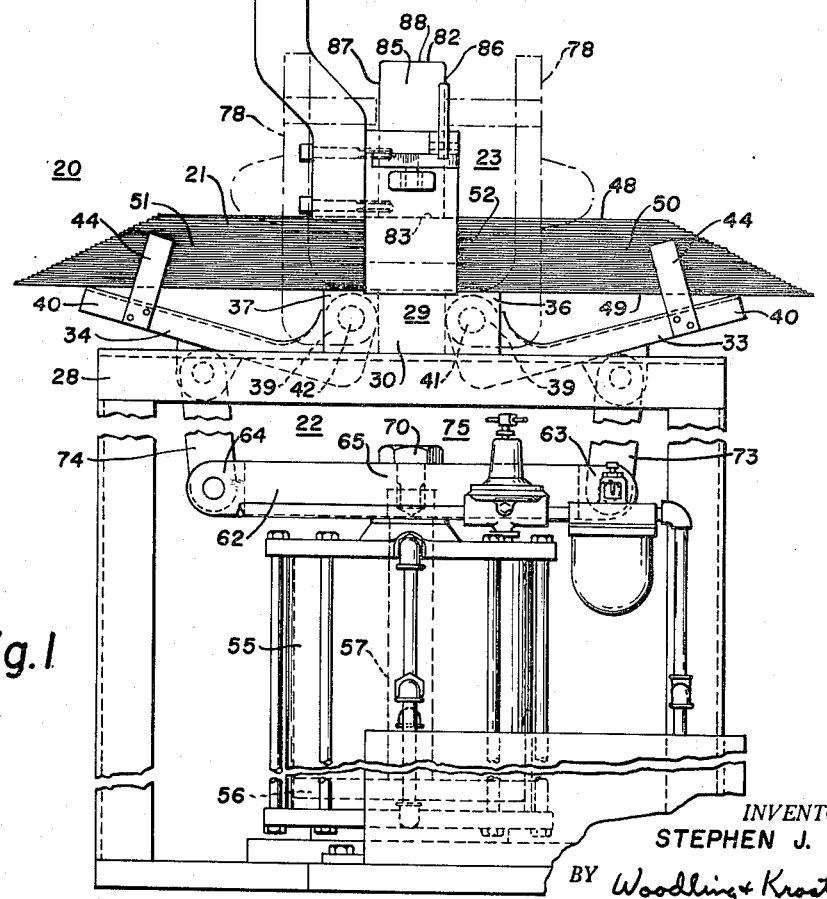
INVENTOR.
STEPHEN J. REIF
BY Woodling & Krost
Atty's.

Oct. 25, 1960

S. J. REIF 2,957,511

LAMINATED CORE FORMING MACHINE

Filed Feb. 3, 1956

INVENTOR.
STEPHEN J. REIF
BY *Woodling & Krost*
*atty's.*

Oct. 25, 1960 S. J. REIF 2,957,511
LAMINATED CORE FORMING MACHINE
Filed Feb. 3, 1956 6 Sheets-Sheet 3
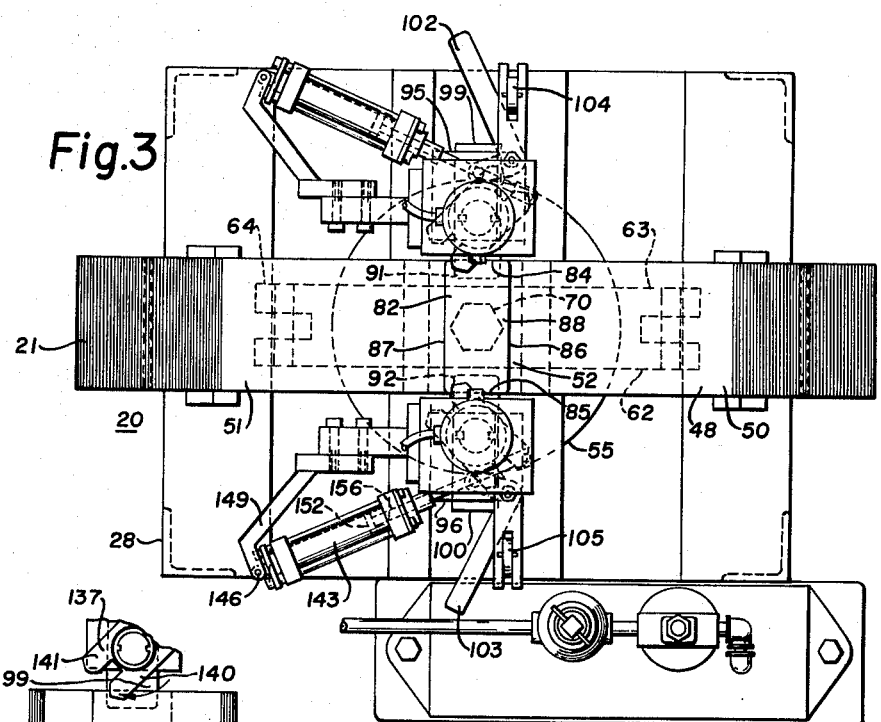
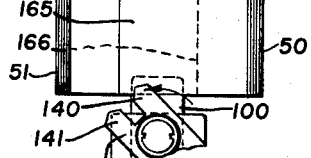
Fig.6
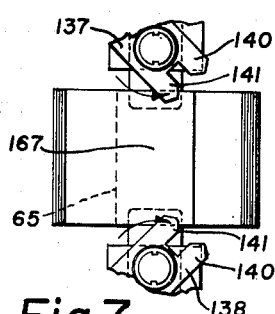
Fig.7
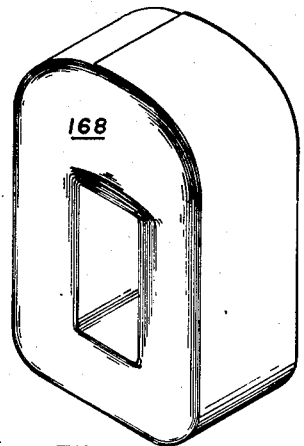
Fig.9
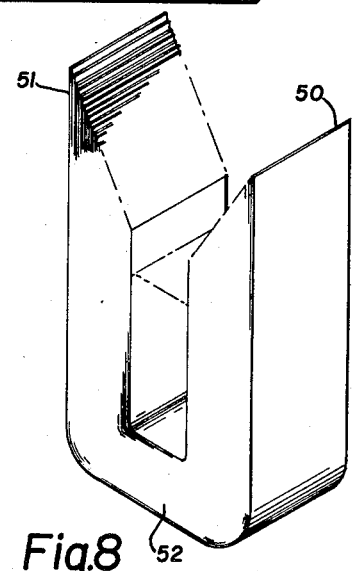
Fig.8
INVENTOR.
STEPHEN J. REIF
BY Woodling & Krost
Attys.

Oct. 25, 1960 S. J. REIF 2,957,511
LAMINATED CORE FORMING MACHINE
Filed Feb. 3, 1956 6 Sheets-Sheet 4

INVENTOR.
STEPHEN J. REIF
BY Woodling & Krost
Attys.

United States Patent Office 2,957,511
Patented Oct. 25, 1960

2,957,511

LAMINATED CORE FORMING MACHINE

Stephen J. Reif, Welland, Ontario, Canada, assignor to Reliance Electric & Engineering (Canada) Ltd.

Filed Feb. 3, 1956, Ser. No. 563,287

8 Claims. (Cl. 153—44)

The invention relates in general to a machine for bending a bendable member into a generally U-shaped configuration and lacing the opposite ends of the bent member together to form the bendable member into a substantially closed loop and more particularly to a machine for bending a stack of metal sheets, which are to be utilized as a transformer core, about a fixedly held mandrel, by means of a foldable platform, into a substantially U-shape and thereafter lacing the opposite ends of the metal sheets each with a constant force, to close the open end of the substantially U-shape to form continuous loops of metal.

An object of the invention is to provide a new and novel machine for bending a metal sheet or a stack of metal sheets around a forming die.

Another object of the invention is to provide a mechanism for holding a die while a metal member is being formed around the die.

Another object of the invention is to provide a platform to receive a member to be bent and having pivotal portions which may be actuated to form the member around a die.

Another object of the invention is to provide a connection means for connecting a power source to a bending arm to be actuated in bending a metal member about a die.

Another object of the invention is to provide a power actuated machine for lacing the ends of a metal member together.

Another object of the invention is to provide means for maintaining a constant force on a lacing finger assembly which is lacing the ends of a stack of members together so that the ends of each member of the stack of members will be laced with the same force and therefore all of the laced ends will be uniformly compressed.

Another object of the invention is to provide means for maintaining a constant force on a lacing finger assembly which is lacing together or overlapping the ends of a stack of metal sheets to form a transformer core so that the ends of each sheet of the stack will be overlapped with the same force and therefore all of the laced ends will be uniformly compressed. This assures that the core so formed will achieve maximum utilization of the iron sheets for magnetic flux transfer from one end to another at the laced section, and thus a minimum amount of iron is required in the core, to thus likewise require a minimum amount of length of wire in the coils surrounding the core.

Another object of the invention is to provide a machine for bending a stack of metal sheets into a U-shape and lacing the ends of the metal sheets together to close the open end of the U-shape.

Another object of the invention is to provide a machine for bending a stack of metal sheets into a curved shape, which machine has a support member and first and second pivotal bending arms connected thereto adapted to receive the stack of metal sheets and a die for holding the stack of metal sheets in place while the pivotal bending arms bend the stack of metal sheets into the arcuate shape around the die.

Another object of the invention is to provide a machine for lacing the ends of an arcuately bent stack of metal sheets together which machine has an arcuately movable selector paddle having first and second arcuately spaced fingers thereon which first finger is adapted to hold in place the ends of the metal sheets which are individually bent down from the bent stack in one direction and the second finger is adapted to hold in place the ends of the metal sheets which are individually bent down from the bent stack in the opposite direction.

Another object of the invention is to provide a machine for lacing the ends of metal sheets together including a selector paddle movable arcuately between a first and a second position, and also movable longitudinally between a first and a second position, with constant force means urging said selector paddle in one of said longitudinal directions.

Another object of the invention is to provide a handling platform for holding a stack of metal sheets while they are bent into a U-shape in a bending machine and for transferring the bent stack of metal sheets to a lacing machine and holding the metal sheets in the lacing machine while the end portions are laced together to form a continuous closed loop of metal.

Another object of the invention is to provide a lacing machine for lacing the ends of a stack of metal sheets together which machine has a lacing assembly carried by a guided support member which support member is movable within a guideway in a longitudinal direction between a first and a second position with counterweight means connected to the support member to exert an upward force on the support member to maintain a predetermined uniform force to obtain uniform lacing of the stack of metal sheets.

Other objects and a fuller understanding of this invention may be had by referring to the following description and claims, taken in conjunction with the accompanying drawings, in which:

Figure 1 is a front elevational view of the bending and lacing machine of the invention;

Figure 3 is a plan view of the machine shown in Figures 1 and 2;

Figure 4 is a sectional view taken along the line 4—4 of Figure 1;

Figure 5 is a partial sectional view taken along the line 5—5 of Figure 4;

Figure 6 is a partial plan view similar to that which is shown in Figure 3 but showing part of the stack of metal sheets as having been already bent around the forming mandrel and illustrating how the selector paddles operate in the lacing operation;

Figure 7 is a view similar to Figure 6 but showing the lacing paddles in the alternate position from that which is shown in Figure 6;

Figure 8 is an isometric view showing the U-shape or curved configuration of the stack of metal sheets after the bending operation in which the sheets are bent around the mandrel;

Figure 9 is an isometric view of the bent stack of metal sheets shown in Figure 8 after the opposite ends of the metal sheets have been laced together or overlapped to form a closed and continuous loop of metal sheets;

Figure 14 is a fragmentary end elevational view of a portion of the lacing machine shown in Figure 13;

Figure 15 is a plan view of the lacing assembly of the machine of Figure 13;

Figure 16 is an isometric view of the handling assembly illustrating the purpose of the handling platform and cover clamp for holding a stack of metal sheets which have been bent in the machine of Figure 10 and laced in the machine of Figure 13.

Figure 2:
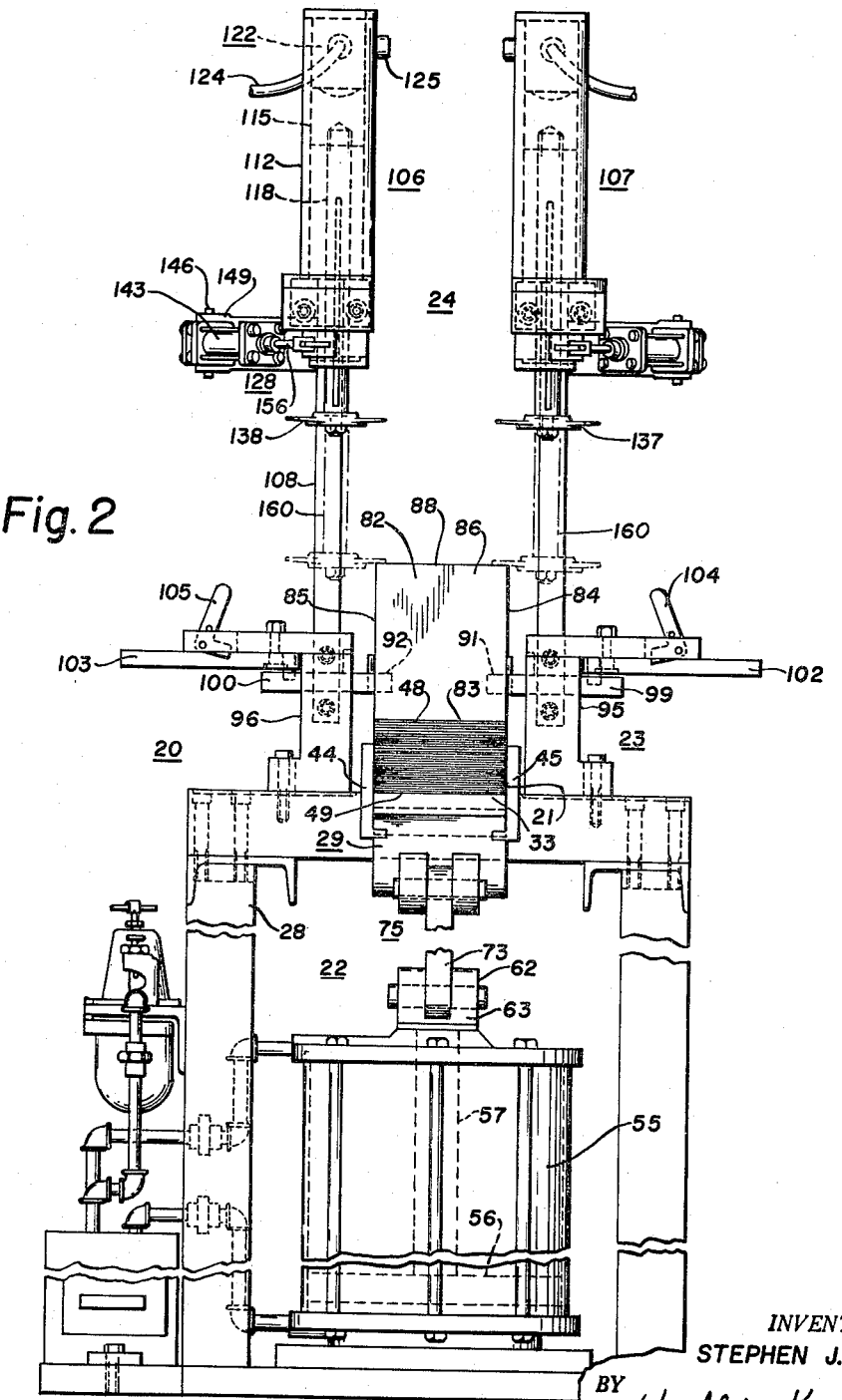
Figure 2 is a side elevational view of the machine shown in Figure 1.

In Figures 1, 2 and 3 a machine 20 for bending and lacing a stack of metal sheets 21 includes in combination bending means 22, mandrel means 23 and lacing means 24. The stack of metal sheets which will be herein described are to be utilized as a transformer core but it should be readily recognized that the bending and lacing machine 20 can be utilized for bending and lacing bendable members regardless of the purpose for which they are to be used. The machine 20 shown best in Figures 1, 2 and 3 may be referred to as having a vertical axis about which the component parts of the machine are symmetrically located. It will be recognized that the machine might assume many directional attitudes and might even be upside down with respect to the position in which it is shown in Figures 1, 2 and 3.

The machine 20 forms a flat stack of metal sheets into a closed loop by generally utilizing the bending means 22 to bend the flat stack of metal sheets around three sides of the mandrel means 23 into a substantially U-shape. The lacing means 24 then is utilized to hold and uniformly compress the ends of the individual metal sheets as they are overlapped across the upper or a fourth side of the mandrel means.

The bending means 22 rests on a framework 28 which carries a primary bending platform generally indicated at 29. This primary bending platform 29 includes a central support member 30 and first and second bending arms 33 and 34. The bending arms 33 and 34 are generally L-shaped with first end portions or short legs 39 and second end portions or long legs 40. The central support member 30 has side portions 36 and 37, and the short legs of the arms 33 and 34 are pivotally attached to these side portions 36 and 37 at the pivotal connections 41 and 42, respectively. A first and a second stock guide 44 and 45 are attached to the second end portion 40 of each of the first and second bending arms 33 and 34, respectively. The stack of metal sheets 21 has top and bottom surfaces 48 and 49 and also has first and second end portions 50 and 51 and an intermediate portion 52 therebetween. The bottom surface 49 of the stack of metal sheets 21 at the intermediate portion 52 thereof resides on and engages the centrally located support member 30 and the bottom surface of the metal sheets 21 at the first and second end portions 50 and 51 thereof engages the second end portions 40 of the first and second bending arms 33 and 34, respectively. The first and second end portions 50 and 51 of the stack of metal sheets 21 reside between the first and second stock guides 44 and 45 on the second end portions of the first and second bending arms 33 and 34. The stock guides thus hold the metal sheets which make up the stack in even alignment with each other.

A bending cylinder 55 is located below the support member 30 within the confines of the framework 28. The bending cylinder 55 has a bending piston 56 and a bending piston rod 57. The bending piston 56 and the bending piston rod 57 are movable between an upper and a lower position within the bending cylinder 55. In the position shown in Figure 1 the bending piston is in the lower position and in the upper position it would be at the other extreme end of the bending cylinder 55.

The bending piston rod 57 extends from the bending cylinder 55 at the upper end thereof. A generally horizontal crossbar 62 is located above the bending cylinder 55 and has a first and a second end 63 and 64, respectively, and an intermediate portion 65 therebetween. A lock screw 70 fixedly secures the intermediate portion 65 of the crossbar 62 to the bending piston rod 57 so that the vertical movement of this piston rod 57 is transmitted to the crossbar 62. A first and a second upwardly extending connecting link 73 and 74 have been provided for transmitting power from the bending cylinder to the first and second bending arms 33 and 34, respectively, to pivot them about the pivots 41 and 42. The first connecting link 73 is pivotally attached at one end thereof to the first end 63 of the crossbar 62 and is pivotally attached at another end to the first bending arm 33. The second connecting link 74 is attached at one end thereof to the second end 64 of the crossbar 62 and is pivotally attached at another end thereof to the second bending arm 34. In Figures 1 and 2 the connecting links 73 and 74 have been shown as being broken between their respective ends for the purpose of enabling the entire machine to be illustrated on a single sheet. The crossbar 62 and the connecting links 73 and 74 may be referred to as power transmitting means 75 to transmit power from the bending cylinder and piston arrangement to the bending platform 29. Upon movement of the bending piston 56 from the lower position in which it has been shown in Figure 1 to the upper position, the power transmitting means causes the first and second bending arm 33 and 34 to travel about their respective pivotal connections 41 and 42 to assume the position indicated by the dot-dash lines 78.

The mandrel means 23, as best seen in Figures 2 and 3, comprises a die 82 having six sides thereon. The six sides of the die 82 have been identified by means of the reference numerals 83 through 88. The side 83 of the die resides on the top surface 48 of the stack of metal sheets 21 at the intermediate portion 52 thereof. The sides 84 and 85 of the die 82 have openings 91 and 92, respectively, extending therein. A first and a second latch structure 95 and 96, respectively, are mounted on the framework 28. First and second die holding members 99 and 100 are carried by the first and second latch structure 95 and 96, respectively. The die holding members 99 and 100 are each movable between a latched and an unlatched position. As shown in Figures 2 and 3 the holding members are residing within the openings 91 and 92, respectively, in the latched position and the die 82 is therefore held in a relatively fixed position thereby prohibiting its removal. The first and second die holding members 99 and 100 are actuated by a first and a second slide control arm 102 and 103. Safety means for maintaining the first and second holding members in the latched position have been provided. The safety means comprise a first and a second lock arm 104 and 105, respectively, which are movable into and out of the plane within which the slide control arms travel. When these lock arms are in the plane of travel of the slide control arms they prevent either outward or inward movement of the control arms and hence maintain the holding members in either the latched or the unlatched position. With the mandrel means in the latched position, the intermediate portion 52 of the stack of metal sheets is securely held in place while the bending operation is performed.

The lacing means 24 comprises a first and a second lacing assembly 106 and 107, respectively. Since the operation and construction of each of the lacing assemblies is similar, for the sake of describing the structure, only one lacing assembly will be referred to. The lacing assembly 106 includes a lacing support 108 extending generally upwardly from the framework 28 and is shown as being secured to the latch structures 96. A vertically disposed and laterally spaced hold-down cylinder assembly 112 is fixedly attached to the upper end of the lacing support 108. A hold-down piston 115 is located in the hold-down cylinder 112 and is movable between an upper and a lower position therein. This hold-down piston has been shown as being in the upper position as seen in Figures 1 and 2. A hold-down piston rod 118 extends downwardly from the hold-down piston 115 for travel with the hold-down piston. Means have been provided for pressurizing the upper ends 122 of the hold-down cylinder 112. This means for pressurizing the hold-down cylinder has been shown as an air line 124 broken off which may be connected to any suitable supply of pressure, as for example, it may be connected to a 15 p.s.i. air supply, and a relief or vent valve 125 which may be, for example, set at 14 p.s.i. Since a supply of air at 15 p.s.i. enters the cylinder and the vent valve 125 is set at 14 p.s.i. this results in a constant force of 14 p.s.i. always present and tending to force the hold-down piston downwardly within the cylinder within which it resides with a force at 14 p.s.i. The hold-down cylinder 112 may also be referred to for the sake of description as a guideway member and the hold-down and piston rod may be referred to as a guided member since they are guided in their movement by means of the hold-down cylinder.

The lacing assemblies 106 and 107 are provided with first and second selector paddles 138 and 137, respectively. Each of the selector paddles is provided with a first and a second arcuately spaced finger 140 and 141 thereon. The selector paddles are adapted to securely hold and compress the overlapped ends of each of the metal sheets which make up the stack of metal sheets. These paddles must move vertically as the lacing operation progresses and they must move arcuately to permit the end of a metal sheet to be overlapped while still holding and compressing a previously overlapped metal sheet. The arcuate movement of the selector paddle is effected by a lacing power and connection mechanism indicated generally at 128. The selector paddle 138 is secured to the lower end of the hold-down piston rod 118 for movement therewith.

The power and connection mechanism 128 includes generally a collar or a driver 126. A base block 129 is secured to the bottom of the hold-down cylinder 112 by means of screws 131. The base block 129 serves as a journal for the collar 126. This holds the collar to the bottom of the hold-down cylinder but allows it to move arcuately. The collar 126 has an opening 132 through which the hold-down piston rod 118 slidably extends. The hold-down piston rod 118 is provided with key-ways 133 and the collar 126 is provided with key-ways 135. Keys 134 reside within the key-ways 133 and 135, respectively, and are fixedly attached to the collar 126. This arrangement permits vertical movement of the hold-down piston rod 118 with respect to the collar 126 and transmits arcuate movement of the collar to the hold-down piston rod.

Each of the selector paddles has been made reversible by the addition of third and fourth fingers 147 and 148 for the purpose that if either of the first and second fingers should become broken or damaged in any way the selector paddle may be simply turned around thus giving the selector paddle a double life. A lacing cylinder 143 is pivotally attached by a pivot member 146 to a bracket member 149 which in turn extends from the lacing support 108. As best seen in Figure 3 the lacing cylinder 143 is provided with a lacing piston 152 which is movable between a first and a second position. A lacing piston rod 156 is provided and is connected at one end portion thereof to the lacing piston and extends from the lacing cylinder in which it resides to pivotally connect at another end portion thereof to the driver 126.

In operation and more specifically referring to Figure 1 the stack of metal sheets 21 is placed upon the bending or foldable platform 29 with the intermediate portion of the stack of metal sheets engaging the central support member 30 and the first and second end portions of the stack of metal sheets extending over and engaging the first and second bending arms 33 and 34, respectively. The first and second stock guides on each of the bending arms maintains the individual metal sheets from lateral movement with respect to each other and hence misalignment. After the stack of metal sheets has been put in place the die 82 is placed in position with the bottom surface 83 thereof in engagement with the top surface 48 at the intermediate portion 52. The die 82 is then latched in this position by means of the first and second die holding members 99 and 100 moving into the openings 91 and 92 in the die. The bending cylinder and piston arrangement 55 and 56 is then actuated by any suitable means such as air pressure and the piston 56 moves from the lower position in which it is shown in Figures 1 and 2 to the upper position at the upper extremity of the bending cylinder 55 and this movement is transmitted by way of the power transmitting means 75 to the first and second bending arms 33 and 34. This causes the first and second bending arms to move about the pivotal connections 41 and 42 into the position which is indicated by the dot-dash lines 78. This causes the top surface 48 of the stack of metal sheets 21 to be bent around three sides of the die 82; namely, sides 83, 86 and 87. The stock guides 44 and 45 on either end of the bending arms maintain the metal sheets in correct alignment during this bending operation. The bending operation just hereinabove described bends the metal sheets into a substantially U-shape which is best seen in Figure 8. Figure 8 has been shown in the drawing in this manner to better illustrate the configuration of the metal sheets after this bending operation. In this figure the relative position of the die member 82 is shown only in dot-dash lines.

After the bending operation has been performed the lacing operation next takes place. During the lacing operation the bending arms 33 and 34 are maintained in the position indicated by the dot-dash lines 78 to securely hold the bent metal sheets in place about the die 82. The lacing operation takes place about the top side 88 of the die 82. The lacing operation closes the open end of the U-shape which has been formed by the bending operation. To commence the bending operation the two hold-down pistons are located and held at the lower position by the application of air pressure at the upper ends 122 of the hold-down cylinders, and hence the first and second selector paddles 137 and 138 are at the position indicated by the dot-dash lines 160 in Figure 2. In this lower position the selector paddles are located substantially in the same plane in which the top surface 88 of the die 82 resides. To better describe the lacing operation reference is best made to Figures 6 and 7 which are on the order of Figure 3 but show the stack of metal sheets as having been bent into the shape shown in Figure 8. In Figure 6 the first and second selector paddle 137 and 138 have been shown in the same position as illustrated in Figure 3. In this position the finger 140 on each of the selector paddles 137 and 138 extends over or is in line with the top surface 88 of the die 82. The steps of the lacing operation which are shown in Figures 6 and 7 will be applicable to the lacing operation throughout. Figure 6 shows the lacing finger 140 on each of the selector paddles 137 and 138 as residing on top of the first end portion of a metal member designated by the reference numeral 165 which has been bent over from the right, as viewed in Figure 6, and on top of the second end portion of a metal sheet indicated by the reference numeral 166, which has previously been bent over from the left, as viewed in this Figure 6. The next step is for the operator of the machine to bend down from the left the second end portion of a metal member 167 over the first finger 140 of each of the selector paddles 137 and 138. This would be an intermediate step between those which are illustrated in Figures 6 and 7. The lacing pistons 152 are then actuated to the second position which causes the selector paddles to move arcuately from the position shown in Figure 6 to the position shown in Figure 7. This movement causes the first fingers 140 to move out from under the second end portion of the metal sheet 167 and at the same time the second fingers 141 ride up over and on top of the second end portion of the metal sheet 167 into the position that is shown in Figure 7. The identical operation then continues until the ends of all of the metal sheets have been laced together. The appearance of the metal members all laced together is indicated in the drawing of Figure 9. Because of the constant air pressure which is maintained on the holddown pistons 115 all of the ends of the metal sheets are laced and held together by a constant force and hence the spacing between the overlapped ends of each of the metal sheets is uniform throughout the entire height of the laced portion 168 of the stack of metal sheets. This provides for a more uniform flow of flux through a transformer core and thus provides that the core losses are cut down and a greater efficiency in the operation of the transformer results. After the lacing operation has been completed the bent and laced metal sheets are then banded together and the bending arms 33 and 34 are lowered to the position indicated by the full line drawing in Figure 1. The metal sheets in the banded condition may be removed from the machine and may be transported to various work areas where various operations are to be performed thereon and including an annealing operation. The die 82 may be made of any suitable material but the preferred material of construction is metal so that the die may be carried without harm through the annealing cycle to which the metal sheets are to be subjected without the necessity of removing the die. The die member, of course, may be constructed of a wood such as hard maple or of any other suitable materials. If of wood, the die would have to be removed before going through the annealing cycle.

Figure 10:
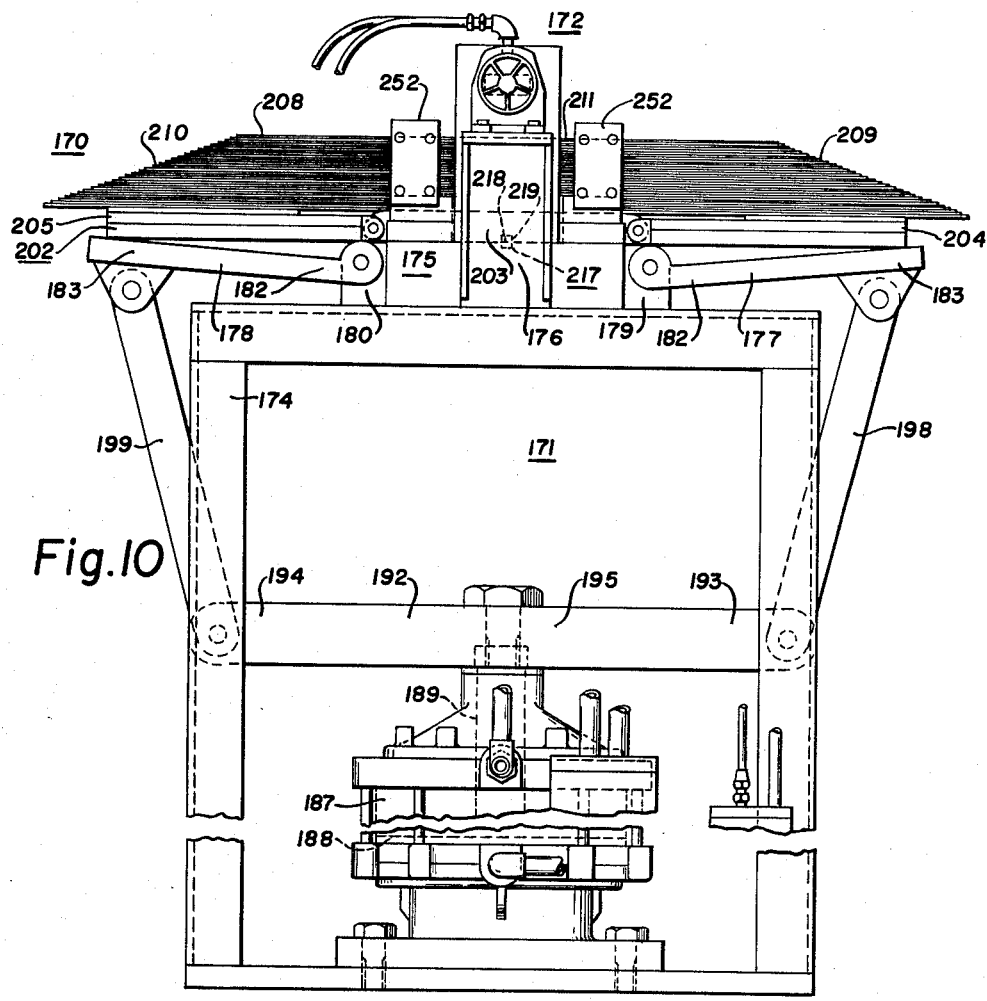
Fig. 10 is a front elevational view of another embodiment of the invention incorporated in a bending machine.

The bending machine which is shown in Figure 10 is indicated generally by the reference numeral 170. The bending machine 170 includes bending means 171 and mandrel means 172. The bending means 171 comprises a framework 174. The framework 174 has a primary platform 175 which includes a centrally located support member 176 and first and second bending arms 177 and 178, respectively. The centrally located support member 176 is fixedly attached to the framework 174 and has a first and a second side portion 179 and 180, respectively. The first and the second bending arm 177 and 178 each have first and second end portions 182 and 183, respectively. The first end portion 182 of the first bending arm 177 is pivotally attached to the first side portion 179 of the centrally located support member 176 and the first end portion 182 of the second bending arm 178 is pivotally attached to the second side portion 180 of the centrally located support member 176. A bending cylinder 187 is located beneath the support member 176 and has a bending piston 188 and a bending piston rod 189 adapted for movement between an upper and a lower position therein. A crossbar 192 which has a first and a second end portion 193 and 194 and an intermediate portion 195 therebetween is located above the bending cylinder 187. The bending piston rod 189 extends between and interconnects the bending piston 188 and the crossbar intermediate portion 195. A first connecting link 198 extends between and is pivotally connected at one end thereof to the first end portion 193 of the crossbar 192 and is connected at the other end thereof to the second end portion of the first bending arm 177. A second connecting link 199 extends between and is pivotally connected at one end to the second end portion 194 of the crossbar 192 and at the other end thereof to the second bending arm 178.

Figure 12:
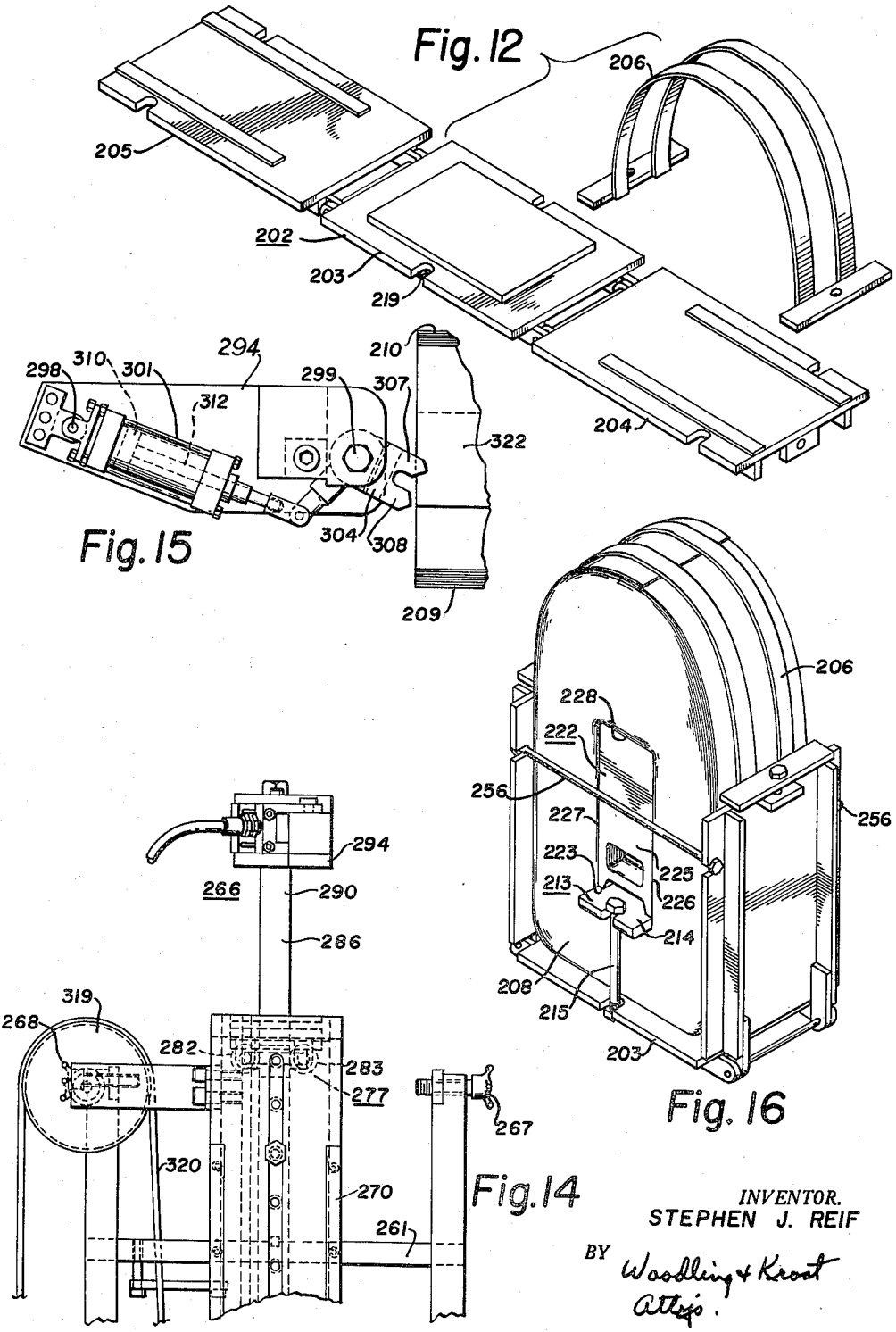
Figure 12 is an isometric view of a handling assembly which includes a handling platform and a cover clamp and which is utilized in conjunction with the bending machine of Figures 10 and 11.

A handling platform indicated generally by the reference numeral 202 is located above the primary platform 175. This handling platform is better seen and illustrated in Figure 12 of the accompanying drawings. The handling platform 202 comprises a central section 203 and a first and a second end section 204 and 205, respectively. The handling platform also includes a cover clamp 206. The first end section 204 is pivotally attached to the central section 203 at one end portion thereof and the second end section 205 is pivotally attached to the central section at another end portion thereof. A stack of metal sheets 208 having first and second end portions 209 and 210, respectively, and an intermediate portion 211 therebetween, resides on the handling platform. This is best seen in Figure 10. Clamp means 213 seen best in Figure 16, are provided to secure the stack of metal sheets 208 to the central section 203 of the handling platform with the first and the second end portions of the stack of metal sheets extending over the first and second end sections of the handling platform. The clamp means 213 includes a clamp plate 214 which rests on the top surface of the stack 208 and is secured to the central section 203 of the handling platform 202 by means of bolts 215. Removable means 217 are provided which includes a tongue 218 on the top surface of the centrally located support member 176 and a groove 219 on the bottom surface of the central section 203 of the handling platform 202. The removable means 217 maintains the handling platform in a fixed condition during the bending operation. As shown in Figure 10 the second end portion 183 of the first bending arm 177 engages or is engageable with the first end section 204 of the handling platform and the second end portion 183 of the second bending arm 178 engages or is engageable with the second end section 205 of the handling platform.

Figure 11:
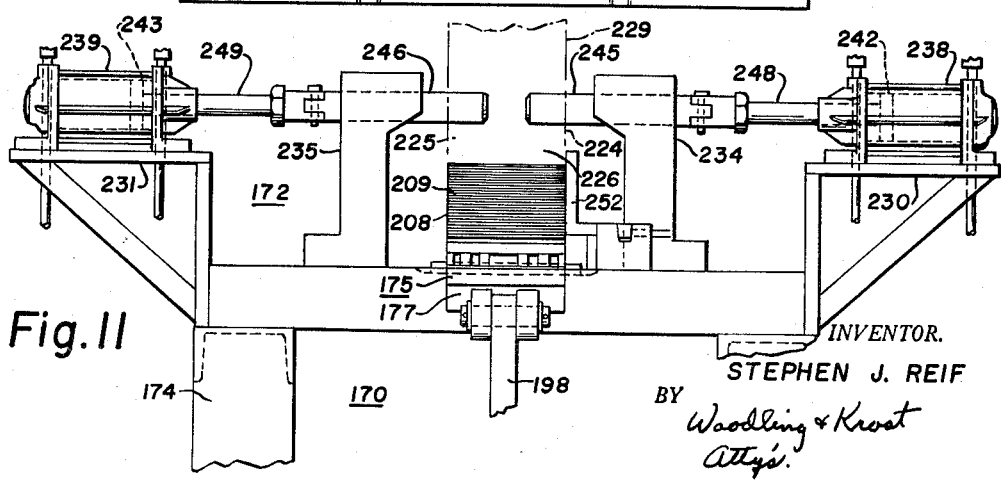
Figure 11 is a fragmentary end elevational view of a portion of the bending machine shown in Figure 10.

The mandrel means 172 comprises a die 222 which has six sides thereon. These sides are indicated by the reference numerals 223 through 228. In Figure 10 the die has not been shown and in Figure 11 the die has been indicated by the dot-dash lines 229. In Figure 16 the die 222 has been shown in full lines. The first side 223 of the die engages the clamp plate 214 at the intermediate portion 211 of the stack of metal sheets 208. The second and third sides of the die 224 and 225, respectively, each have openings extending therein. First and second secondary support platforms 230 and 231 are connected to the framework 174. First and second support bearing members 234 and 235, respectively, are mounted on the framework 174. A first and a second holding cylinder 238 and 239, respectively, are mounted on the first and the second secondary supporting platforms 230 and 231, respectively. The first and second holding cylinders 238 and 239, respectively, are mounted on the first and the second secondary supported platforms 230 and 231, respectively. The first and second holding cylinders 238 and 239 have first and second holding pistons 242 and 243, respectively, located therein and movable between a locked and an unlocked position. Figure 11 illustrates the first and second holding piston as being in the locked position. A first and a second holding member 245 and 246, respectively, are slidably supported by the first and second support bearing members 234 and 235, respectively, and are connected to the first and second holding pistons 242 and 243 by means of a first and a second holding piston rod 248 and 249. As will be noted from Figure 11 the first and second holding members 245 and 246 are located within the openings in the second and third sides 224 and 225 of the die 222 and prohibit removal of the die. The first and second support bearing members provide stability to the holding members and prevent force on the extreme ends of the holding members from damaging the holding cylinder and piston assembly. Aligning members 252 are supported by the framework 174 and are utilized to maintain the plurality of metal sheets which make up the stack of metal members in even alignment throughout their vertical extent.

In operation the stack of metal sheets is placed upon the handling platform 202 in the position in which they are shown in Figure 10. This particular operation may be performed while the handling platform is off of the bending machine 170 or may be done while the handling platform is located on the bending machine as shown in Figure 10. If the operation is performed while off of the machine then it is necessary to lift the handling platform onto the machine and locate the groove 219 on the bottom of the central section in complementary engagement with the tongue 218 which is provided on the top surface of the centrally located support member 176. When this has been done the die 222 is placed with the first side 223 thereof in engagement with the clamp late 214. The holding pistons 242 and 243 are then actuated to the latched position wherein the first and second holding members 245 and 246 enter the openings in the second and third sides of the die and prevent the die from movement thereafter. The bending piston 188 is then actuated from the lower position in which it is shown in Figure 10 to the upper position. The movement is transmitted by way of the bending piston rod 189, the crossbar 192 and the first and second connecting links 198 and 199, respectively, to the first and second bending arms 177 and 178. The bending arms are thus moved about their respective pivotal connections and engage the first and second end sections of the handling platform thereby causing these end sections to move about their respective pivotal connections. As a result the first and second end portions of the stack of metal sheets are caused to be formed or bent around the fourth and fifth sides 226 and 227, respectively, of the die 222. After the metal sheets have been bent into this position the handling platform and the stack of metal sheets are in what might be referred to as a U-shape. While in this position the handling platform with the bent metal sheets therein is secured in this position by means of bolts 256 which extend between the first and second end sections 204 and 205, respectively, and are best seen in Figure 16.

After the metal sheets have been bent into the U-shape in the machine of Figures 10 and 11 and after the bolts 256 have been put in place to hold the handling platform in its shape, the bent stack of metal sheets as held within the handling platform are removed from the machine of Figures 10 and 11. The bent U-shape stack of metal sheets is then transported to the machine shown in Figures 13, 14 and 15 where the lacing operation takes place.

Figure 13:
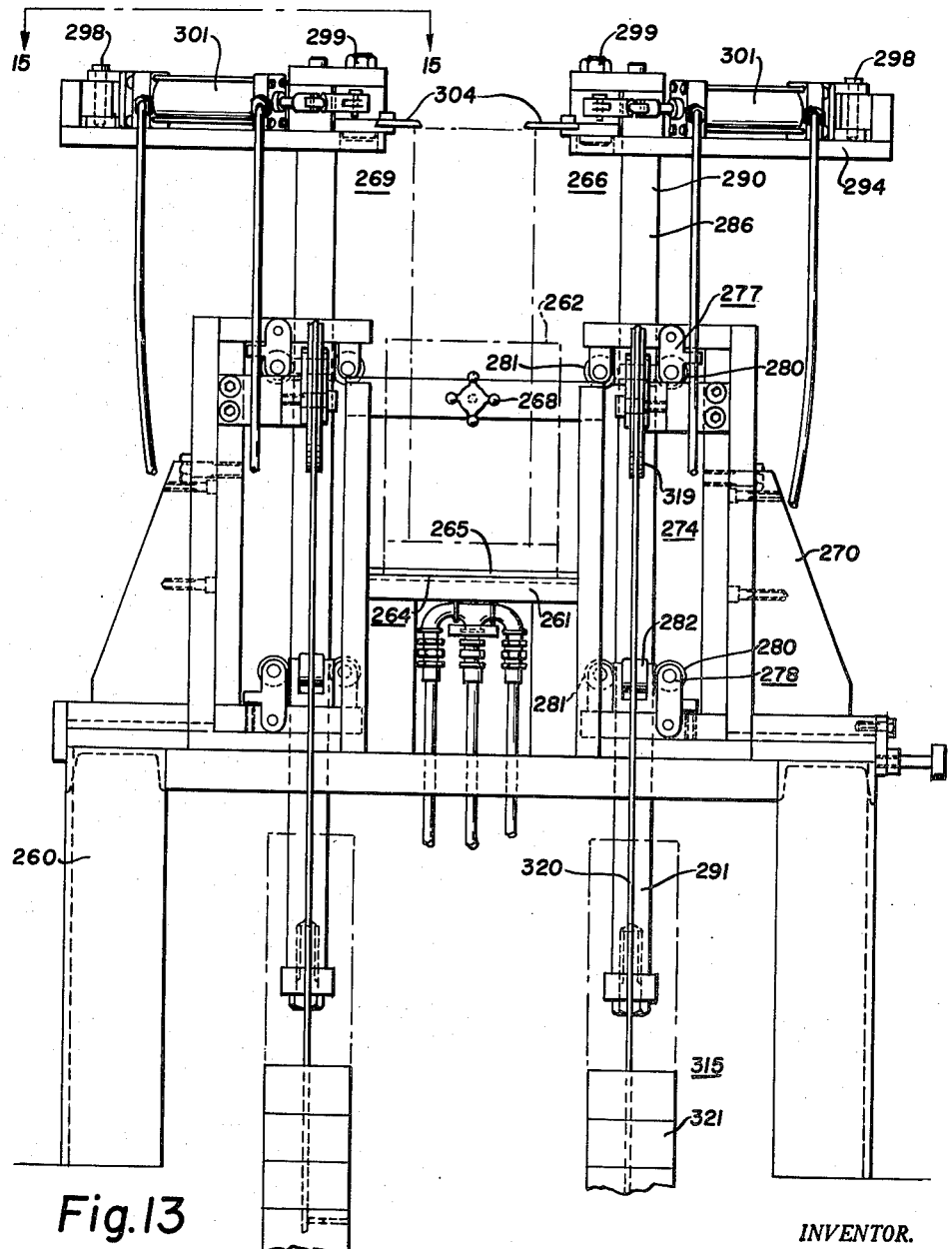
Figure 13 is a front elevational view of another embodiment of the invention incorporated in a lacing machine.

The lacing machine shown in Figures 13, 14 and 15 is for lacing the ends of the bent U-shape stack of metal sheets together, and comprises a framework 260 having a primary platform 261 thereon. The handling platform 202 which has been hereinbefore described in conjunction with the machine of Figures 10 and 11 resides on the primary platform 261. In Figure 13 the position of the handling platform 202 has been indicated by the dot-dash lines 262. Removable means 264 are provided for removably securing the central section 203 of the handling platform 202 to the primary platform 261. The removable means 264 includes the groove 219 on the bottom surface of the central section 203 and a tongue 265 on the top surface of the primary platform 261. First and second adjustable hand knobs 267 and 268 are provided for assisting in positioning the handling platform upon the primary platform 261 and are also used for securing the handling platform so that during the lacing operation the handling platform will be held in a fixed position and undue swaying of the assembly will be prevented. The die member 222 which was utilized in the bending machine of Figures 10 and 11 remains within the bent sheets and will also be used in connection with the lacing operation.

In the machine of Figures 13, 14 and 15, first and second lacing finger assembly structures 266 and 269 have been shown generally and since each are substantially the same only the assembly structure 266 will be described in the forthcoming description. The assembly structures include a lacing assembly support 270 suitably secured to and carried by the framework 260. A vertical guideway 274 is carried by the lacing assembly support 270. The vertical guideway includes first and second sets of vertically spaced rollers 277 and 278, respectively. Each of the first and second sets of rollers comprises four rollers indicated by the reference numerals 280 through 283 all of whose axes lie in substantially the same horizontal plane and substantially ninety degrees with respect to each other in this horizontal plane. As a result the four rollers of each set are spaced substantially ninety degrees with respect to each other and form a square space therebetween. A square shaped guided support member 286 which has a first and second end portion 290 and 291 resides within the vertical guideway 274 and is movable between an upper and a lower position therein. The upper position is indicated by the full line drawings of Figures 13 and 14. A lacing plate mount 294 is carried by the first end portion 290 of the guided support member 286 and is movable therewith. First and second pivot members 298 and 299 are carried by the lacing plate mount 294. A lacing cylinder 301 is pivotally connected by the first pivot member 298 and a selector paddle 304 is pivotally connected by the second pivot member 299. The selector paddle 304 has a first and a second arcuately spaced finger 307 and 308, respectively, thereon. The lacing cylinder 301 has a lacing piston 310 therein and movable between a first and a second position. The first position is indicated by the full line drawing of Figure 15. The lacing piston rod 312 is connected at one end portion thereof to the lacing piston 310 and is pivotally connected at another end portion thereof to the selector paddle 304. Counterweight means 315 cooperate with the lacing finger assembly structure 266 to exert a force thereon tending to move it to the upper position shown by the full line drawing of Figure 13. The counterweight means 315 includes a roller member 319 journalled for rotation on a bearing which is suitably attached to the framework 260 of the lacing machine. A cable 320 is carried by the roller member 319 and one end portion thereof is suitably connected to the second end portion 291 of the guided support member 286. The second end portion of the cable extends to and is provided with a plurality of counterweights 321 removably connected thereto. As will be noted counterweights may be added or taken from the second end portion of the cable depending on the particular weight which is desired. One of the reasons for providing the counterweights is to reduce the downward force caused by the weight of the lacing finger assembly structure 266. It will thus be seen that a means for providing a constant downward force between limits may be had by merely adding or taking off counterweights 312. This provides a predetermined constant downward force for the entire lacing operation. The movement of the lacing fingers in operation in the machine of Figures 13, 14 and 15 is essentially the same as that which was described in great detail in discussing the machine in Figures 1, 2 and 3. Figure 15, however, is provided to additionally explain the lacing operation. As shown in Figure 15 the selector paddle 304 is in the first position and a portion of the bent U-shape stack of metal sheets have been shown. The top surface 228 of the die 222 is the surface about which the lacing operation takes place. As shown in Figure 15 the first lacing finger 307 of the selector paddle 304 resides over and holds down the end of a metal sheet 322 which has been bent down from end portion 210 of the bent stack of metal sheets. The next subsequent operation is for the operator of the machine to bend the next metal sheet from the opposite end portion 209, over the top of the first finger 304. While this metal sheet 322 is held down the lacing piston 310 within the lacing cylinder 301 is actuated to the second position which would be, as viewed in Figure 1, an arcuate movement in a counterclockwise direction until the first finger 307 is out of line with the top surface of the die 222 and the second finger 308 would then be in line with the top surface of the die 222 and would perform the function which the first finger performs as shown in Figure 15. This identical operation is, of course, carried out by the selector paddle which is carried by the other lacing plate mount on the opposite side of the die 222 until the end portions of the entire U-shaped stack of metal sheets has been laced or overlapped about the top surface 228 of the die 222 and the metal sheets have been formed into a closed loop. It will be noted that during the lacing operation, as the end portions of each metal sheet are overlapped and because of the movement and action of the selector paddle 304 the guided support member 286 and the appurtenances carried therewith ride vertically above the primary platform 261 and are guided by the vertical guideway 274 while still maintaining a constant force on the selector paddles during the lacing operation. This provides for a uniform thickness between all of the laced ends of the individual metal sheets of the stack. After the lacing operation has been completed the cover clamp 206 is placed over the laced ends of the metal sheets and is suitably secured at either end to the first and second end sections 204 and 205, respectively, of the handling platform 202. This position is shown completely in Figure 16. The bent and laced metal sheets while held within the handling platform in this position may then be moved about without fear that the individual metal sheets will be misplaced because of rough and violent handling. While held in this position they are transported to and through an annealing cycle whereby the metal sheets are then in condition to be utilized in their function as a transformer core.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine for making a transformer core from a stack of metal sheets including in combination bending means, mandrel means and lacing means; said bending means comprising a framework, said framework having a primary bending platform, said primary bending platform including a centrally located support member and a first and a second bending arm, said centrally located support member connected to said framework, said support member having first and second side portions, said first and said second bending arm each having a first and a second end portion, respectively, said first bending arm pivotally attached at said first end portion to said first side portion of said support member and said second bending arm pivotally attached at said first end portion to said second side portion of said support member, a first and a second stock guide attached to said second end portion of each said first and second bending arm, said stack of metal sheets having top and bottom surfaces and having first and second end portions and an intermediate portion therebetween, said bottom surface of said metal sheets at said intermediate portion thereof residing on and engaging said centrally located support member, said bottom surface of said metal sheets at said first and second end portions thereof engaging said second end portions, respectively, of said first and second bending arms, said first and second end portions of said stack of metal sheets residing between said first and second stock guides on said second end portions, respectively, of said first and second bending arms, a bending cylinder located below said support member, said bending cylinder having a bending piston and a bending piston rod, said bending piston and said bending piston rod movable between an upper and a lower position, said bending piston rod extending from said bending cylinder, a crossbar having a first and a second end portion and an intermediate portion therebetween, said intermediate portion of said crossbar fixedly attached to said bending piston rod for movement therewith, a first and a second connecting link, said first and second connecting link each pivotally attached at one end portion thereof to said first and second end portions of said crossbar, respectively, and each pivotally attached to said first and second bending arms, respectively, at another end portion thereof; said mandrel means comprising a die having first, second and third sides, said first side of said die residing on said top surface of said stack of metal sheets at said intermediate portion, thereof, said second and third sides of said die having openings extending therein, a first and a second latch structure mounted on said framework, first and second die holding members carried by said first and second latch structures, respectively, and each movable between a latched and an unlatched position, said first and second die holding members in said latched position residing within said openings in said die, and prohibiting removal of said die safety means for maintaining said first and second holding members in said latched position, said first and second holding members in said unlatched position permitting removal of said die; said lacing means comprising a first and a second lacing support extending upwardly from said first and second latch structures, respectively, a first and a second vertically disposed hold-down cylinder assembly fixedly attached to the upper end of said first and second lacing supports, respectively, a first and a second hold-down piston located in said first and second hold-down cylinders, respectively, and movable between an upper and a lower position therein, a first and a second hold-down piston rod each having first and second end portions, said first end portion of each said first and second hold-down piston rod attached to said first and second hold-down pistons, respectively, for movement therewith, means for pressurizing each said first and second hold-down cylinder whereby a constant force is exerted on each said first and second hold-down piston tending to maintain said first and second hold-down pistons in said lower position, a first and a second driver carried by said first and second hold-down cylinders, respectively, each said first and second drivers adapted for arcuate movement between a first and a second position, each said first and second driver having an opening extending therethrough, said first and second hold-down pistons extending through said openings in said first and second drivers, respectively, said first and second drivers permitting vertical sliding movement of said first and second hold-down piston rods, respectively, therethrough, connection means causing arcuate movement of said first and second drivers to be transmitted to said first and second hold-down piston rods, respectively, a first and a second selector paddle attached to said second end portion of said first and second hold-down pistons, respectively, for vertical and arcuate movement therewith, each said first and second selector paddle having a first and a second arcuately spaced finger thereon, a first and a second lacing cylinder pivotally connected to said first and second lacing supports, respectively, a first and a second lacing piston residing within said first and second lacing cylinders, respectively, and movable between a first and a second position, a first and a second piston rod, each said first and second driver piston rods connected at one end portion thereof to said first and second lacing pistons, respectively, and pivotally connected at another end portion thereof to said first and second drivers, respectively.

2. A machine for bending and lacing a stack of metal sheets including in combination bending means, mandrel means and lacing means; said bending means comprising a bending platform including a support member having first and second side portions and a first and a second bending arm, said first bending arm pivotally attached to said first side portion of said support member and said second bending arm pivotally attached to said second side portion of said support member, said metal sheets adapted to reside on said bending platform, a bending cylinder located below said support member, said bending cylinder having a bending piston and a bending piston rod, said bending piston and said bending piston rod movable between an upper and a lower position, said bending piston rod extending from said bending cylinder, a crossbar having a first and a second end portion, said crossbar attached to said bending piston rod for movement in accordance therewith, a first and a second connecting link, said first and second connecting link each pivotally attached at one end portion thereof to said first and second end portions of said crossbar, respectively, and each pivotally attached to said first and second bending arms, respectively, at another end portion thereof; said mandrel means comprising a die about which said metal sheets are adapted to be bent, means securing said die a fixed distance from said support member, said stack of metal sheets adapted to reside between said support member and said die, said lacing means comprising a first and a second hold-down cylinder assembly secured above said bending platform, a first and a second hold-down piston located in said first and second hold-down cylinders, respectively, and movable therein, a first and a second hold-down piston rod each having first and second end portions, said first end portion of each said first and second hold-down piston rod attached to said first and second hold-down pistons, respectively, for movement therewith, means for pressurizing each said first and second hold-down cylinder whereby a constant force is exerted on each said first and second hold-down piston tending to maintain said first and second hold-down pistons at one end of said first and second cylinder, a first and a second driver carried by said first and second hold-down cylinder assemblies, respectively, each said first and second drivers adapted for arcuate movement between a first and a second position, connection means causing arcuate movement of said first and second drivers to be transmitted to said first and second hold-down piston rods, respectively, and permitting vertical sliding movement of said first and second hold-down piston rods relative to said first and second drivers, a first and a second selector paddle attached to said second end portion of said first and second hold-down pistons, respectively, for vertical and arcuate movement therewith, each said first and second selector paddle having a first and a second arcuately spaced finger thereon, a first and a second lacing cylinder each pivotally attached for arcuate movement thereabout, a first and a second lacing piston residing within said first and second cylinders, respectively, and movable between a first and a second position, a first and a second piston rod, each said first and second driver piston rods connected at one end portion thereof to said first and second lacing pistons, respectively, and connected at another end portion thereof to said first and second drivers, respectively.

3. A machine for forming a metal member into a closed loop including in combination bending means, mandrel means and lacing means; said bending means comprising a bending platform, said bending platform including a support member and a first and a second bending arm, said first bending arm swingably attached to said support member and said second bending arm swingably attached to said support member, bending motive power means connectable to said first and second bending arms for moving said first and second bending arms about their respective swingable points of attachment, said mandrel means comprising a die, means for fixedly holding said die a spaced distance from said bending platform; said lacing means comprising a first and a second hold-down cylinder, a first and a second hold-down piston located in said first and second hold-down cylinders, respectively, and movable longitudinally therein, a first and a second hold-down piston rod each having first and second end portions, said first end portion of each said first and second hold-down piston rod attached to said first and second hold-down pistons, respectively, for movement therewith, constant force means cooperating with each said first and second hold-down cylinder whereby a constant force is exerted on each said first and second hold-down piston tending to maintain said first and second hold-down pistons at one end of said first and second cylinders, lacing motive power means causing arcuate movement of said first and second hold-down piston rods, a first and a second selector paddle attached to said second end portion of said first and second hold-down pistons, respectively, for longitudinal and arcuate movement.

4. A machine for bending a stack of metal sheets including in combination bending means and mandrel means; said bending means comprising a framework, said framework having a primary bending platform, said primary bending platform including a support member and a first and a second bending arm, said support member connected to said framework, said support member having first and second side portions, said first and said second bending arm each having a first and a second end portion, respectively, said first bending arm pivotally attached at said first end portion to said first side portion of said support member and said second bending arm pivotally attached at said first end portion to said second side portion of said support member, a bending cylinder located below said support member, said bending cylinder having a bending piston and a bending piston rod, said bending piston and said bending piston rod movable between an upper and a lower position, said bending piston rod extending from said bending cylinder, a crossbar having a first and a second end portion and an intermediate portion therebetween, said intermediate portion of said crossbar fixedly attached to said bending piston rod for movement therewith, a first and a second connecting link, said first and second connecting link each pivotally attached at one end portion thereof to said first and second end portions of said crossbar, respectively, and each pivotally attached to said first and second bending arms, respectively, at another end portion thereof; said mandrel means comprising a die having first, second and third sides, said first side of said die residing a spaced distance from said support member whereby metal sheets may be received therebetween which are adapted to be bent around said die by said bending arms, said second and third sides of said die having openings extending therein, a first and a second latch structure mounted on said framework, first and second die holding members carried by said first and second latch structures, respectively, and each movable between a latched and an unlatched position, said first and second die holding members in said latched position residing within said openings in said die, and prohibiting removal of said die, and said first and second holding members in said unlatched position permitting removal of said die.

5. A lacing machine comprising a framework and having a first and a second lacing support, said first and second lacing supports extending upwardly from said framework, a first and a second hold-down cylinder attached to the upper end portion of said first and second lacing supports, respectively, a first and a second hold-down piston located in said first and second hold-down cylinders, respectively, and movable between a first and a second position therein, a first and a second hold-down piston rod each having first and second end portions, said first end portion of each said first and second hold-down piston rod attached to said first and second hold-down pistons, respectively, for movement therewith, means for pressurizing each said first and second hold-down cylinder whereby a constant force is exerted on each said first and second hold-down pistons tending to maintain said first and second hold-down pistons in said first position, a first and a second driver carried by said first and second hold-down cylinders, respectively, each said first and second drivers adapted for arcuate movement between a first and a second position, said first and second drivers permitting longitudinal sliding movement of said first and second hold-down piston rods, respectively, with respect thereto, connection means causing arcuate movement of said first and second drivers to be transmitted to said first and second hold-down piston rods, respectively, a first and a second selector paddle attached to said second end portion of said first and second hold-down pistons, respectively, for longitudinal and arcuate movement therewith, each said first and second selector paddle having a first and a second arcuately spaced finger thereon, a first and a second lacing cylinder pivotally connected to said first and second lacing supports, respectively, a first and a second lacing piston residing within said first and second lacing cylinders, respectively, and movable between a first and a second position, a first and a second driver piston rod, each said first and second driver piston rods connected at one end portion thereof to said first and second lacing piston, respectively, and pivotally connected at another end portion thereof to said first and second drivers, respectively.

6. A lacing machine comprising a lacing support, a hold-down cylinder attached to one end of said lacing support, a hold-down piston located in said hold-down cylinder and movable between a first and a second position therein, a hold-down piston rod having first and second end portions, said first end portion of said hold-down piston rod attached to said hold-down piston for movement therewith, means for pressurizing said hold-down cylinder whereby a constant force is exerted on each said hold-down piston tending to maintain said hold-down piston in said first position, a driver carried by said hold-down cylinder, said driver adapted for arcuate movement between a first and a second position, said driver permitting longitudinal sliding movement of said hold-down piston rod with respect thereto, connection means causing arcuate movement of said driver to be transmitted to said piston rod, a selector paddle attached to said second end portion of said hold-down piston for longitudinal and arcuate movement therewith, a lacing cylinder pivotally connected to said lacing support, a lacing piston residing within said lacing cylinder and movable between a first and a second position, a driver piston rod, said driver piston rod connected at one end portion thereof to said lacing piston and pivotally connected at another end portion thereof to said driver.

7. A machine for bending a stack of metal sheets and lacing the ends of the metal sheets together to form the metal sheets into a closed loop including a primary platform adapted to receive the stack of metal sheets, said platform comprising a support member and a first and a second arm member, said support member having a first and a second end portion, said first arm member pivotally connected to said first end portion of said support member, said second arm member pivotally connected to said second end portion of said support member, means for moving said first and second arm members about their respective pivotal connections, a die, holding means holding said die about which the stack of metal sheets are adapted to be bent upon movement of said first and second arm members of said platform about their respective pivotal connections, a fixed member and a movable member, said movable member adapted for movement in a first direction, said fixed member comprising a guideway for guiding said movable member, means urging said movable member along said guideway in said first direction with a predetermined constant force, a lacing assembly comprising a selector paddle having first and second spaced apart fingers, said selector paddle carried by and movable with said movable member, and means for moving said selector paddle in an arcuate direction.

8. A machine for bending a metal sheet including a framework, said framework having a primary bending platform, said primary bending platform including a support member and a first and a second bending arm, said support member secured to said framework, said first bending arm pivotally attached to said support member at one portion thereof and said second bending arm pivotally attached to said support member at another portion thereof, motive power means for actuating said machine, power transmission means operably connecting said motive power means to said primary bending platform to move said first and second bending arms about their respective pivotal connections, said power transmission means comprising a cross arm and first and second connecting links, said first connecting link pivotally connected at one end portion to said cross arm and pivotally connected at the other end portion to said first bending arm, said second connecting link pivotally connected at one end portion to said cross arm and pivotally connected at the other end portion to said first bending arm, a die positioned adjacent said bending platform, and holding means maintaining said die in said position.

References Cited in the file of this patent

UNITED STATES PATENTS

| | | |
|---|---|---|
| 173,120 | Green, W. | Feb. 8, 1876 |
| 1,319,608 | Nelson | Oct. 21, 1919 |
| 2,287,933 | Green, L. | June 30, 1942 |
| 2,446,824 | Green, L. | Aug. 10, 1948 |
| 2,465,705 | Bath | Mar. 29, 1949 |
| 2,474,528 | Hook et al. | June 28, 1949 |
| 2,523,071 | Somerville | Sept. 19, 1950 |